(12) United States Patent
Beetz

(10) Patent No.: US 11,666,969 B2
(45) Date of Patent: Jun. 6, 2023

(54) 3D PRINTING DEVICE AND 3D PRINTING METHOD

(71) Applicant: Brose Fahrzeugteile GmbH & Co. Kommanditgesellschaft, Würzburg, Würzburg (DE)

(72) Inventor: Stefan Beetz, Barnin (DE)

(73) Assignee: Brose Fahrzeugteile GmbH & Co. Kommanditgesellschaft, Würzburg

( * ) Notice: Subject to any disclaimer, the term of this patent is extended or adjusted under 35 U.S.C. 154(b) by 1018 days.

(21) Appl. No.: 16/348,188

(22) PCT Filed: Nov. 7, 2017

(86) PCT No.: PCT/EP2017/078419
§ 371 (c)(1),
(2) Date: May 8, 2019

(87) PCT Pub. No.: WO2018/087067
PCT Pub. Date: May 17, 2018

(65) Prior Publication Data
US 2019/0263057 A1    Aug. 29, 2019

(30) Foreign Application Priority Data
Nov. 8, 2016    (DE) .......................... 102016221889.1

(51) Int. Cl.
*B22F 7/08* (2006.01)
*B33Y 10/00* (2015.01)
(Continued)

(52) U.S. Cl.
CPC ............... *B22F 7/08* (2013.01); *B22F 10/12* (2021.01); *B22F 10/28* (2021.01); *B22F 10/34* (2021.01);
(Continued)

(58) Field of Classification Search
CPC .. B22F 1/14; B22F 10/10; B22F 10/20; B22F 10/28; B22F 10/40; B22F 12/00;
(Continued)

(56) References Cited

U.S. PATENT DOCUMENTS 10,513,081 B1 * 12/2019 Vittimberga ......... G06K 19/041
2015/0108695 A1    4/2015 Okada
(Continued)

FOREIGN PATENT DOCUMENTS

DE    102012107297 A1    6/2014
DE    102013221385 A1    4/2015
(Continued)

*Primary Examiner* — Dana Ross
*Assistant Examiner* — Joe E Mills, Jr.
(74) *Attorney, Agent, or Firm* — Dickinson Wright PLLC

(57) ABSTRACT

A 3D printing device for producing a three-dimensional component form at least two different materials. The 3D printing device has both a spray-printing unit and an electron-beam and/or laser unit. To produce the three-dimensional component, the spray-printing unit is designed and set up to spray the at least two different materials, and the electron-beam and/or laser unit is designed and set up to join sprayed-on material integrally by fusing by means of an electron beam and/or by means of a laser beam of the electron-beam and/or laser unit.

18 Claims, 3 Drawing Sheets

(51) Int. Cl.

| | |
|---|---|
| *B33Y 30/00* | (2015.01) |
| *B29C 64/209* | (2017.01) |
| *B29C 64/268* | (2017.01) |
| *B29C 64/165* | (2017.01) |
| *B29C 64/106* | (2017.01) |
| *B29C 64/153* | (2017.01) |
| *B22F 10/12* | (2021.01) |
| *B22F 10/28* | (2021.01) |
| *B22F 12/41* | (2021.01) |
| *B22F 12/45* | (2021.01) |
| *B22F 12/53* | (2021.01) |
| *B22F 10/43* | (2021.01) |
| *B22F 10/34* | (2021.01) |
| *B29K 505/00* | (2006.01) |
| *H01F 5/02* | (2006.01) |
| *B22F 12/46* | (2021.01) |
| *B22F 12/50* | (2021.01) |

(52) U.S. Cl.
CPC .............. *B22F 10/43* (2021.01); *B22F 12/41* (2021.01); *B22F 12/45* (2021.01); *B22F 12/53* (2021.01); *B29C 64/106* (2017.08); *B29C 64/153* (2017.08); *B29C 64/165* (2017.08); *B29C 64/209* (2017.08); *B29C 64/268* (2017.08); *B33Y 10/00* (2014.12); *B33Y 30/00* (2014.12); *B22F 12/46* (2021.01); *B22F 12/50* (2021.01); *B22F 2998/10* (2013.01); *B22F 2999/00* (2013.01); *B29K 2505/00* (2013.01); *H01F 5/02* (2013.01); *Y02P 10/25* (2015.11)

(58) Field of Classification Search
CPC .......... B22F 12/41; B22F 12/45; B22F 12/53; B22F 2998/10; B22F 2999/00; B22F 7/008; B22F 7/08; B29C 64/106; B29C 64/153; B29C 64/165; B29C 64/209; B29C 64/268; B29K 2505/00; B33Y 10/00; B33Y 30/00; B33Y 70/10; H01F 5/02; Y02P 10/25; Y02P 10/00
See application file for complete search history.

(56) References Cited

U.S. PATENT DOCUMENTS

| | | |
|---|---|---|
| 2015/0244214 A1 | 8/2015 | Kreidler et al. |
| 2015/0273583 A1* | 10/2015 | Bumgardner ........... B22F 10/20 |
| | | 419/53 |
| 2016/0279873 A1 | 9/2016 | Fette et al. |
| 2018/0243827 A1* | 8/2018 | Nakano .................. B22F 12/00 |
| 2018/0272607 A1* | 9/2018 | Chaffins .................. H05K 3/10 |

FOREIGN PATENT DOCUMENTS

| | | |
|---|---|---|
| DE | 102014018081 A1 | 6/2016 |
| DE | 102015104827 A1 | 9/2016 |
| JP | 2015217682 A | 12/2015 |
| WO | 2009073498 A1 | 6/2009 |
| WO | 2014116254 A1 | 7/2014 |
| WO | 2015056232 A1 | 4/2015 |
| WO | 2016148343 A1 | 9/2016 |
| WO | 2016149301 A1 | 9/2016 |

* cited by examiner

3D PRINTING DEVICE AND 3D PRINTING METHOD

CROSS-REFERENCE TO RELATED APPLICATIONS

This application is the U.S. National Phase of PCT Application No. PCT/EP2017/078419 filed on Nov. 7, 2017, which claims priority to German Patent Application No. DE 10 2016 221 889.1, filed on Nov. 8, 2016, the disclosures of which are incorporated in their entirety be reference herein.

TECHNICAL FIELD

The present disclosure relates to a 3D printing device for producing a three-dimensional component, and to a 3D printing method.

BACKGROUND

In 3D printing, three-dimensional components are usually constructed layer by layer from one or more materials. Here, for example, plastics, resins, ceramics and metals are used as materials. In this context, it is known to produce three-dimensional components by way of selective laser sintering (for thermoplastics), by way of selective laser melting (for metals) or selective electron beam melting (for metals). Only one material is used in said methods, in the case of which material is melted locally, in order to produce the respective three-dimensional component.

Furthermore, the inkjet-like 3D printing methods are known, in the case of which different materials which are present in each case in powder form or as a liquid are sprayed on layer by layer in an analogous manner with respect to an inkjet printer. Here, plastic materials are usually used which are then mostly cured under UV light.

SUMMARY

The present disclosure may provide one or more methods and devices configured to provide an improved solution for the 3D printing of a three-dimensional component, in particular a stator for an electric motor.

The present disclosure may provide a combination of a spray printing unit for spraying on different materials with an electron beam and/or laser unit for at least locally melting sprayed-on material, in order to connect said material in an integrally joined manner. Here, the material to be connected by means of an electron beam or by means of a laser beam is therefore previously sprayed on in droplet form (wet or dry, depending on whether the material is stored, for example, in liquid or powder form) by way of a spray printing unit in the manner of inkjet printing. Here, for example, by way of a 3D printing device, in addition to spraying on of cross linkable plastic material, the generation of a melt for the integrally joined connection of defined sections of the three-dimensional component to be produced (possibly made from another sprayed-on material) can be realized. In this way, highly complex components with different material requirements can also be produced in a 3D printing operation from different materials.

A 3D printing device according to one or more embodiments, for producing or for printing a three-dimensional component from at least two different materials accordingly has both a spray printing unit and an electron beam and/or laser unit. In order to produce the three-dimensional component, the spray printing unit is set up and provided to spray on the at least two different materials and, furthermore, the electron beam and/or laser unit is set up and provided to connect sprayed-on material in an integrally joined manner by way of melting by means of an electron beam and/or by means of a laser beam of the electron beam and/or laser unit. The sprayed-on material which is to be melted by way of the electron beam and/or laser unit can be precisely one of the plurality of different sprayed-on materials or else a mixture of at least two different materials.

In one design variant, the 3D printing device which integrates a spray printing unit and an electron beam and/or laser unit has a component platform for the three-dimensional component to be produced, above which component platform both the electron beam and/or laser unit and a print head of the spray printing unit can be positioned. The structure of the three-dimensional component to be printed can therefore be produced in the 3D printing device with the use of both the spray printing unit and the electron beam and/or laser unit, without a part of the component or a blank for the component to be produced being removed from the component platform.

In this context, a 3D printing device provides, for example, in one variant that the electron beam and/or laser unit and/or the print head can be moved relative to the component platform along at least two first and second spatial directions which run substantially perpendicularly with respect to one another. Here, the electron beam and/or laser unit and the print head can be arranged, for example, on two different moving devices or on a common moving device of a moving system, which moving devices allow an external power-actuated movement of the two units in a plane which is defined by way of the two first and second spatial directions. For a compact overall design, a moving system may be suitable, in the case of which the electron beam and/or laser unit and the print head of the spray printing unit can be moved, for example, pneumatically, hydraulically and/or by electric motor in an infinitely variable manner above the component platform in an XY plane of an XYZ coordinate system.

Furthermore, the electron beam and/or laser unit and/or the print head can be capable of being moved relative to the component platform along a third spatial direction which runs substantially perpendicularly with respect to the first and second spatial directions, in order for it to be possible, in particular, for the applying or spraying on of the individual material layers to also be adapted vertically, along the third spatial direction. As an alternative or in addition, it goes without saying that the component platform can be capable of being moved along a third spatial direction relative to the electron beam and/or laser unit and/or the print head for this purpose. Here, for example, the electron beam and/or laser unit and/or the print head of the spray printing unit would then be capable of being moved in an XY plane, whereas the component platform can be moved along a Z axis of the XYZ coordinate system.

The 3D printing device can be set up to spray on a first and/or a second material by means of the spray printing unit in one work process, and to melt sprayed-on first and/or second material selectively and at least locally in a second work process. The first material may include, for example, a metal powder, whereas the second material may include a plastic material and/or a resin. It goes without saying, however, that at least one of the different materials can also comprise a ceramic, or the materials comprise merely different metals or different plastics and differ from one another in this respect.

In one possible development, the spray printing unit has a UV light emitter for curing sprayed-on plastic material. Here, for example, a 3D printing method can then be implemented by means of the 3D printing device, in the case of which 3D printing method plastic material is sprayed on by means of the spray printing unit, is crosslinked, and is cured by means of the UV light emitter, before local melting is subsequently carried out in said plastic material or another plastic-based or metallic material which has likewise been sprayed on by means of the spray printing unit, in order to produce a section of the three-dimensional component.

A laser unit of the 3D printing device can be set up and provided for selective laser sintering (SLS) and/or selective laser melting (SLM). Accordingly, an electron beam unit can be set up and provided for selective electron beam melting (EBM).

A further aspect may relate to a 3D printing method for producing or for printing a three-dimensional component from at least two different materials.

In order to produce the component, it is provided here that
at least a first and a second material for the component are sprayed on layer by layer by means of a spray printing unit, and
sprayed-on material is connected in an integrally joined manner by means of an electron beam and/or laser unit by way of melting by means of an electron beam and/or by means of a laser beam of the electron beam and/or laser unit.

A 3D printing method according to the one or more embodiments therefore builds on the basic concept of the indicated in the above text, namely of producing a three-dimensional component by way of combined spraying on of different materials and selective melting of sprayed material.

In one design variant, a first and/or a second material are/is sprayed on, for example, by means of the spray printing unit, in order to form a supporting structure for a melt of sprayed-on material which is generated locally by means of the electron beam and/or laser unit. The first and/or second sprayed-on material therefore border/borders a region which has been sprayed on from said material or another material and which is subsequently melted by way of the electron beam and/or laser unit. A corresponding supporting structure therefore finds uncontrolled flowing of the melt and delimits the corresponding region.

In order to produce the three-dimensional component, it is provided in one design variant, for example, to spray on a metal powder and a plastic material by means of the spray printing unit, and to melt at least part of the sprayed-on metal powder locally by means of the electron beam and/or laser unit. Whereas the sprayed-on plastic, for example a liquid photopolymer, forms a fixed structure after spraying on as a result of crosslinking, a solid structure is produced by way of the metal powder only by the melting.

In this context, it can also be provided that the sprayed-on metal powder is surrounded by sprayed-on plastic material, in particular by UV light cured plastic material, with the result that a metal melt comprising the sprayed-on metal powder which is generated by means of the electron beam and/or laser unit is surrounded by way of a supporting structure made from sprayed-on plastic material.

A metal powder which is used can fundamentally comprise an aggregate for obtaining and/or increasing the flowability of the metal powder. In one variant, an aggregate is provided, which evaporates after the spraying-on operation under the ambient conditions prevailing at the component platform. The evaporating aggregate thus serves for obtaining and/or increasing the flowability of the metal powder, but does not then have any influence during the melting of the metal powder by means of the electron beam and/or laser beam unit. As an alternative or in addition, an aggregate can also be provided which is non-critical for the melting process in any case or is even advantageous with regard to desired material and component properties.

For example, a stator for an electric motor is produced by means of a 3D printing method according to one or more embodiments, both at least one coil former of the stator and at least one insulation layer, that may be made from a plastic material, for the coil former being printed by way of the 3D printing method. Here, as a consequence, both the coil former which is produced from a metallic material and an insulation layer which is produced from a plastic material would be constructed layer by layer in the 3D printing method. Here, the two components of the stator are produced in a single printing operation in a 3D printing device which is equipped with at least one spray printing unit and/or at least one electron beam and/or laser unit.

A 3D printing method according to one or more embodiments can fundamentally be implemented by means of a 3D printing device according to the present disclosure. Accordingly, variants and features which are described in the preceding text and in the following text in relation to a 3D printer device also apply to a 3D printing method, and vice versa.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
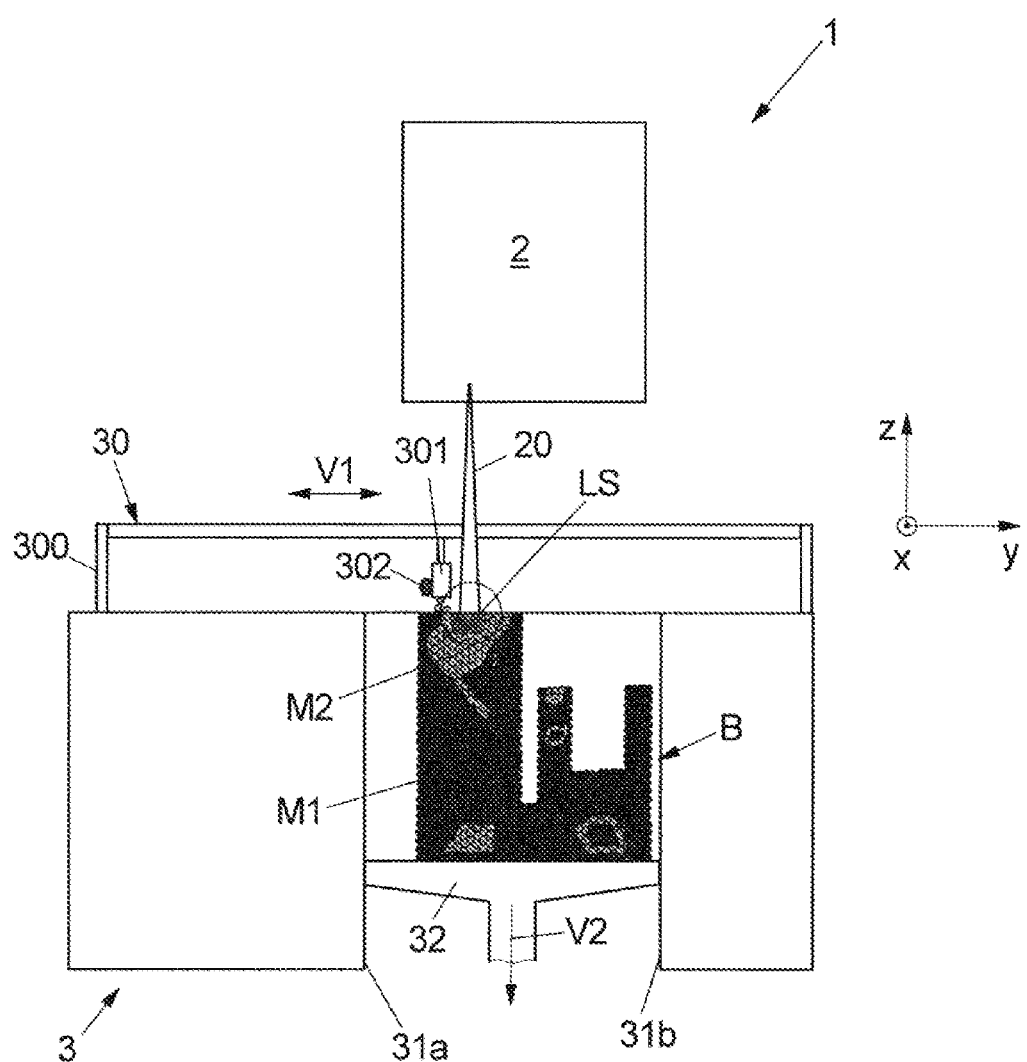
FIG. 1 shows one exemplary embodiment of a 3D printing device according to one or more embodiments.

FIG. 1 shows one exemplary embodiment of a 3D printing device 1, in the case of which a spray printing unit 3 (for an inkjet-like 3D printing method) is combined with an electron beam and/or laser unit 2 for selective electron beam melting or selective laser sintering or laser melting in a device for printing a three-dimensional component B. Here, part of the 3D printing device 1 is a component platform 32, on which the component B to be printed is constructed layer by layer with the aid of the electron beam and/or laser unit 2 and the spray printing unit 3.

In the present case, the component platform 32 is arranged between side walls 31a, 31b and such that it can be displaced along the Z axis within an XYZ coordinate system. A spacing of the component platform 32 from an electron beam and/or laser source of the electron beam and/or laser unit 2 which is arranged above the component platform 32 can be changed by way of movement of the component platform 32 along the Z axis in a moving direction V2. A spacing along the Z axis from a print head 301 of the spray printing unit 3 can likewise be set via this, over which spacing different materials M1 and M2 are sprayed on for 3D printing of the three-dimensional component B.

The print head 301 is part of a print head device 30 of the spray printing unit 3. Said print head device 30 may include, inter alia, a moving system 300, for example with a pneumatic, hydraulic or electric motor drive (not shown here) for moving the print head 301 in the XY plane of the XYZ coordinate system. In addition to the print head 301, a UV light emitter 302 is also mounted movably above the component platform 32 via the moving system 300. Via the moving system 300, the UV light emitter 302 can therefore be moved synchronously, in particular, along a moving direction V1 along the Y axis and the X axis which runs perpendicularly with respect thereto. A three-dimensional structure for the component to be produced can be printed by way of material which is sprayed on via the print head 303, and said material can possibly be cured by the UV light emitter 302. Here, for example, provision can be made via the UV light emitter 302 for the curing or the crosslinking of a plastic material which is sprayed on by the print head 301, for example of a photopolymer.

Figure 2:
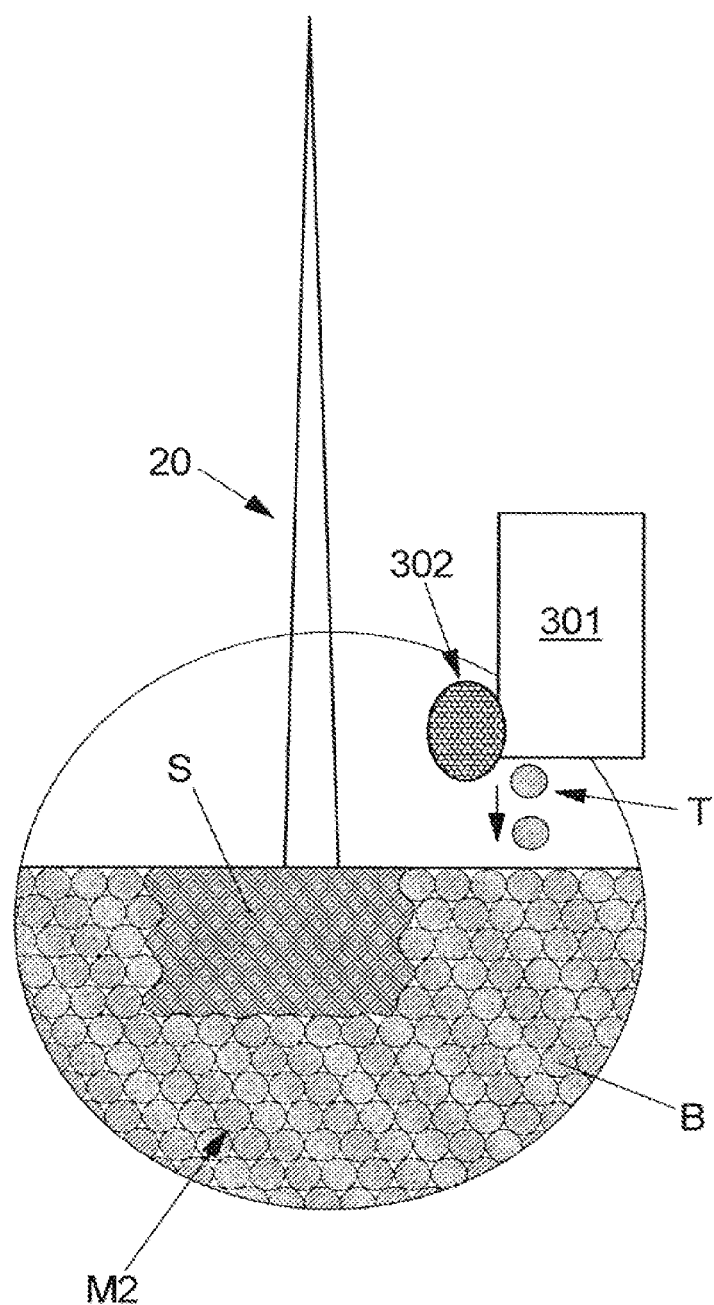
FIG. 2 shows an enlarged illustration of a detail of the 3D printing device of FIG. 1 with a print head which has been moved in comparison with FIG. 1.

As is also illustrated, in particular, using the enlarged illustration of FIG. 2, different 3D printing methods are combined with one another in the 3D printing device 1; in addition to spraying on of different materials M1 and M2 in the manner of inkjet printing firstly, selective melting or sintering by an electron or laser beam 20 secondly.

FIGS. 1 and 2 illustrate the printing of a component B from a metallic material M1 and from a plastic-based material M2 by way of example. Here, both powder metal (material M1) and liquid plastic material (material M2) are sprayed on via the print head 301, in order to configure the required three-dimensional structure layer by layer for the three-dimensional component B to be produced. In order to configure a solid, single-piece structure section by way of the metal here, sprayed-on metal powder is melted selectively and locally by the electron beam and/or laser unit 2. In order to prevent uncontrolled flowing out or away of a melt S which is generated by an electron or laser beam 20, plastic material 2 which has previously been sprayed on and has preferably already been cured serves as a supporting structure which surrounds the melt S on all sides. This is shown clearly using the enlarged illustration of FIG. 2.

Therefore, a three-dimensional component B can be produced in a simple way by way of the 3D printing device 1, in the case of which three-dimensional component B a contiguous single-piece structure made from a metal is embedded within a structure made from plastic, the two structures having been produced completely in a 3D printing method, with the result that there are virtually no limitations with regard to the complexity of the respective structure. It goes without saying that it is also otherwise possible in this context to (likewise) selectively and locally melt the plastic material 2 which is sprayed on in droplets T, or to correspondingly melt another plastic material which is sprayed on via the print head 301 and does not cure automatically and also does not cure under UV light. Therefore, for example, firstly a plastic M2 which cures in the case of UV light can be printed by way of the 3D printing device which is shown, and secondly metal powder M1 can be printed in the same work process. In a following work process, the metal powder M1 can then be melted selectively and locally within the same 3D printing device 1 by the electron beam and/or laser unit 2, and the powder can therefore be joined to form a solid structure section. Here, the surrounding plastic material M1 serves not only for insulation, but rather also as a temporary supporting structure for the melt S which is produced of the melted metal powder M1.

In order to improve and/or obtain the flowability, the metal powder M1 can comprise an aggregate which evaporates after being sprayed on.

It is also to be noted at this point that it goes without saying that a resin and/or a ceramic can (also) be sprayed on via the print head 302 instead of a plastic material M2. In one possible variant, the electron beam and/or laser unit 2 may include an electron beam and/or laser source from EOS GmbH which is currently used for metal laser sintering (MLS). A print head device 30 can be taken, for example, from an Objet® 3D printer from the company Stratasys.

The three-dimensional component B to be printed can be, for example, a stator for an electric motor, both at least one coil former of the stator made from metal and at least one insulation layer made from plastic for the coil former being printed here.

Figure 3:
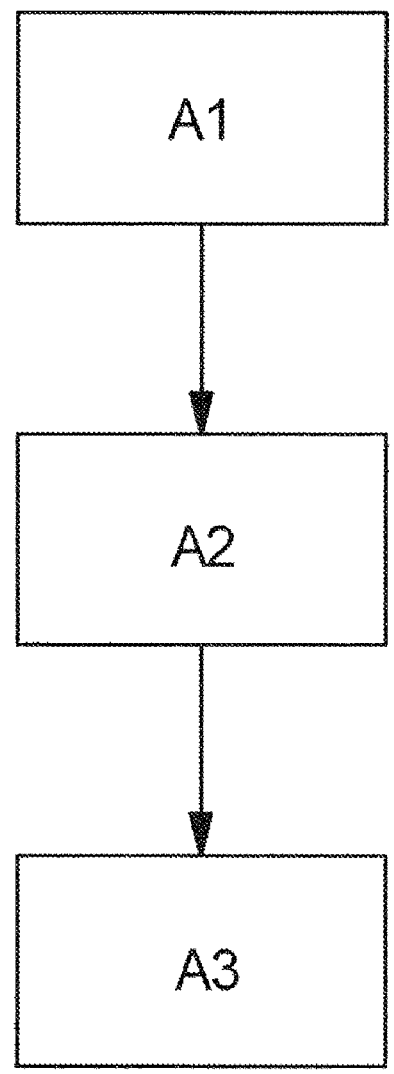
FIG. 3 shows a flow chart for one design variant of a 3D printing method according to one or more embodiments.

A flow chart of one variant of a 3D printing method which can be implemented by way of the 3D printing device 1 is also illustrated diagrammatically using FIG. 3. Here, in a first method step A1, the spraying of the different materials M1 and M2, for example metal and plastic, is provided. Subsequently, curing of the plastic material takes place before, in a further method step A3, the sprayed-on metal which is present in powder form is melted selectively and locally, in order to produce a single-piece solid metal structure, for example in a "bed" made from and therefore enclosed in sprayed-on plastic material.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF DESIGNATIONS 1 3D printing device
2 Electron beam and/or laser unit
20 Electron or laser beam
3 Spray printing unit
V1, V2 Moving direction
30 Print head device
300 Moving system
301 Print head
302 UV light emitter
31a, 31b Side wall
B Component
M1, M2 Material
S Melt
T Material droplets

The invention claimed is:

1. A 3D printing device for producing a three-dimensional component from at least two different materials, the 3D printing device comprising:
 a spray printing unit; and
 an electron beam unit,
 wherein the spray printing unit is configured to spray the at least two different materials, and wherein the electron beam unit is configured to connect sprayed-on material in an integrally joined manner by way of melting by means of an electron beam, wherein the 3D printing device is configured to spray on, with the spray printing unit, a metal powder as a first material and liquid plastic material as a second material in a first process, and to selectively melt, with the electron beam unit, at least portions of the sprayed-on first material in a subsequent second process, and wherein the 3D printing device is configured to form a supporting structure for a melt of sprayed-on material and to locally generate the melt using the electron beam unit.

2. The 3D printing device of claim 1, wherein the 3D printing device includes a component platform for the three-dimensional component to be produced, wherein the electron beam unit and a print head of the spray printing unit are positioned above the component platform.

3. The 3D printing device of claim 2, wherein at least one of the electron beam unit and the print head is configured to move relative to the component platform in a first spatial direction and a second spatial direction, wherein the first spatial direction is perpendicular to the second spatial direction.

4. The 3D printing device of claim 3, wherein at least one of the electron beam unit and the print head is configured to move relative to the component platform in a third spatial direction, wherein the third spatial direction is perpendicular with respect to the first and second spatial directions, or the component platform is configured to move relative to at least one of the electron beam unit and the print head along the third spatial direction.

5. The 3D printing device of claim 1, wherein the spray printing unit includes a UV light emitter configured to cure the plastic material.

6. A 3D printing method for producing a three-dimensional component formed of at least two different materials, the 3D printing method comprising:
spraying a plurality of layers of a first material and a second material using a spray printing unit; and
melting, using an electron beam unit, the plurality of layers of the first material and the second material such that plurality of layers of the first material and the second material are integrally joined,
wherein, in a first process, a metal powder as a first material and liquid plastic material as a second material are sprayed on, and in a subsequent second process, using the electron beam unit, at least portions of the sprayed-on first material are melted, and
wherein the spraying step includes forming a supporting structure for a melt of sprayed-on material, wherein the melt is generated locally using the electron beam unit.

7. The 3D printing method of claim 6, wherein the spraying step includes surrounding the metal powder by the plastic material, such that during the melting step a metal melt is generated using the electron beam unit, and wherein the metal melt is surrounded by a supporting structure formed by the plastic material.

8. The 3D printing method of claim 6, wherein the metal powder includes an aggregate configured to alter a flowability of the metal powder.

9. The 3D printing method of claim 6, further comprising:
forming at least one stator coil of a stator for use in an electric motor by performing the spraying step and the melting step; and
forming at least one insulation layer of the stator coil by the performing the spraying step and the melting step, wherein a three-dimensional component formed of at least two different materials includes the at least one stator coil and the at least one insulation layer.

10. A 3D printing device for producing a three-dimensional component from at least two different materials, the 3D printing device comprising:
a spray printing unit; and
a laser unit,
wherein the spray printing unit is configured to spray the at least two different materials, and wherein the laser unit is configured to connect sprayed-on material in an integrally joined manner by way of melting by means of a laser beam,
wherein the 3D printing device is configured to spray on, with the spray printing unit, a metal powder as a first material and liquid plastic material as a second material in a first process, and to selectively melt, with the laser unit, at least portions of the sprayed-on first material in a subsequent second process, and
wherein the 3D printing device is configured to form a supporting structure for a melt of sprayed-on material and to locally generate the melt using the laser unit.

11. The 3D printing device of claim 10, wherein the 3D printing device includes a component platform for the three-dimensional component to be produced, wherein the laser unit and a print head of the spray printing unit are positioned above the component platform.

12. The 3D printing device of claim 11, wherein at least one of the laser unit and the print head is each configured to move relative to the component platform in a first spatial direction and a second spatial direction, wherein the first spatial direction is perpendicular to the second spatial direction.

13. The 3D printing device of claim 12, wherein at least one of the laser unit and the print head is configured to move relative to the component platform in a third spatial direction, wherein the third spatial direction is perpendicular with respect to the first and second spatial directions, or the component platform is configured to move relative to at least one of the laser unit and the print head along the third spatial direction.

14. The 3D printing device of claim 10, wherein the spray printing unit includes a UV light emitter configured to cure the plastic material.

15. A 3D printing method for producing a three-dimensional component formed of at least two different materials, the 3D printing method comprising:
spraying a plurality of layers of a first material and a second material using a spray printing unit; and
melting, using a laser unit, the plurality of layers of the first material and the second material such that plurality of layers of the first material and the second material are integrally joined,
wherein, in a first process, a metal powder as a first material and liquid plastic material as a second material are sprayed on, and in a subsequent second process, using the laser unit, at least portions of the sprayed-on first material are melted, and
wherein the spraying step includes forming a supporting structure for a melt of sprayed-on material, wherein the melt is generated locally using the laser unit.

16. The 3D printing method of claim 15, wherein the spraying step includes surrounding the metal powder by the plastic material, such that during the melting step a metal melt is generated using the laser unit, and wherein the metal melt is surrounded by a supporting structure formed by the plastic material.

17. The 3D printing method of claim 15, wherein the metal powder includes an aggregate configured to alter a flowability of the metal powder.

18. The 3D printing method of claim 15, further comprising:
   forming at least one stator coil of a stator for use in an electric motor by performing the spraying step and the melting step; and
   forming at least one insulation layer of the stator coil by the performing the spraying step and the melting step, wherein a three-dimensional component formed of at least two different materials includes the at least one stator coil and the at least one insulation layer.

* * * * *